United States Patent
Riise et al.

(10) Patent No.: US 7,685,119 B2
(45) Date of Patent: Mar. 23, 2010

(54) SYSTEM AND METHOD FOR QUERY EXPANSION

(75) Inventors: Soren Riise, Middlesex (GB); Devesh Patel, Cupertino, CA (US); Bruce Campbell, Potters Bar (GB); David Richardson-Bunbury, London (GB); Eugene Stipp, London (GB); Rosie Jones, Pasadena, CA (US)

(73) Assignee: Yahoo! Inc., Sunnyvale, CA (US)

( * ) Notice: Subject to any disclaimer, the term of this patent is extended or adjusted under 35 U.S.C. 154(b) by 507 days.

(21) Appl. No.: 11/642,207

(22) Filed: Dec. 20, 2006

(65) Prior Publication Data

US 2008/0154856 A1 Jun. 26, 2008

(51) Int. Cl.
*G06F 17/30* (2006.01)

(52) U.S. Cl. .............. 707/5; 707/6; 707/7; 707/10

(58) Field of Classification Search .......... 707/3, 707/5, 4, 6, 7, 10
See application file for complete search history.

(56) References Cited

U.S. PATENT DOCUMENTS

| | | | |
|---|---|---|---|
| 6,092,049 A * | 7/2000 | Chislenko et al. ............ 705/10 |
| 6,526,440 B1 * | 2/2003 | Bharat ........................ 709/219 |
| 6,725,259 B1 * | 4/2004 | Bharat ........................ 709/219 |
| 7,031,961 B2 * | 4/2006 | Pitkow et al. ................. 707/4 |
| 7,231,405 B2 * | 6/2007 | Xia .......................... 707/104.1 |
| 7,392,278 B2 * | 6/2008 | Chen et al. .................... 707/3 |
| 2005/0187923 A1 * | 8/2005 | Cipollone .................... 707/3 |
| 2006/0064411 A1 * | 3/2006 | Gross et al. .................. 707/3 |
| 2006/0074870 A1 * | 4/2006 | Brill et al. ................... 707/3 |
| 2006/0106793 A1 * | 5/2006 | Liang ......................... 707/5 |
| 2006/0190490 A1 * | 8/2006 | Ritchey et al. .......... 707/104.1 |
| 2006/0218114 A1 * | 9/2006 | Weare et al. .................. 707/1 |
| 2006/0242129 A1 * | 10/2006 | Libes et al. ................... 707/3 |
| 2006/0271531 A1 * | 11/2006 | O'Clair et al. ................ 707/5 |
| 2007/0005686 A1 * | 1/2007 | Fish et al. .................... 709/203 |
| 2007/0100824 A1 * | 5/2007 | Richardson et al. ........... 707/7 |
| 2007/0255552 A1 * | 11/2007 | Thiesson et al. .............. 704/8 |
| 2007/0294225 A1 * | 12/2007 | Radlinski et al. ............. 707/3 |
| 2008/0021860 A1 * | 1/2008 | Wiegering et al. ............ 707/1 |
| 2008/0116265 A1 * | 5/2008 | Hanson ..................... 235/383 |
| 2008/0126343 A1 * | 5/2008 | Frank et al. .................. 707/5 |

* cited by examiner

*Primary Examiner*—Don Wong
*Assistant Examiner*—Thanh-Ha Dang
(74) *Attorney, Agent, or Firm*—Brinks Hofer Gilson & Lione (57) ABSTRACT

A system is disclosed for expanding a user query based on user learned popularity rankings. User queries often have no exact match, resulting in a user having to refine or abandon the search. The disclosed system obtains popularity rankings based on the content of a user query. The system expands the user query based on the popularity rankings. Thereafter, query results based on the expanded user query may be provided to the user. The system also regularly learns from user behavior and adapts the popularity rankings according to the learned information.

21 Claims, 7 Drawing Sheets

SYSTEM AND METHOD FOR QUERY EXPANSION

BACKGROUND

1. Technical Field

This application relates to search engines. In particular, this application relates to expanding queries based on learned popularity rankings.

2. Related Art

The availability of powerful tools for developing and distributing Internet content has led to an increase in information, products, and services offered through the Internet, as well as a dramatic growth in the number and types of consumers using the Internet. To sift through this immense volume of information, a user often submits queries to search engines that provide responsive information that meets the criteria specified by the queries.

For example, user queries that include geographic content may enable enterprises to identify entities, such as place names, street addresses, or other entities associated with a specific physical location. Geographic or other query types may provide an important source of revenue for e-commerce enterprises, such as Internet-based search engines, advertisers, etc. E-commerce enterprises provide results to a user based on the user's submitted query terms or other relevant information. In this manner, such enterprises may provide advertising and other information or content to the user.

However, a user query may not always result in an exact relevant match, often resulting in a user having to refine or abandon the search. In the example of a geographic query, an on-line search for "pizza in San Marino, Calif." may not produce any actual matches on "pizza" in the locality of "San Marino." However, there may be relevant results located near the location queried by the user, such as in a neighboring locality. Those results should be found and provided to the user even though the original search terms did not contain those specific nearby locations. More generally, there may often be information, advertisements, media, or other potential search results that do not exactly match a user's query terms, but would nonetheless be relevant to the user's query and should thus be found and provided to the user.

A need therefore exists for a system that expands queries to better match a user's preferred query scope.

BRIEF SUMMARY

A system is disclosed for expanding a user query based on popularity rankings. The system receives a user query. The system obtains one or more popularity ranking based on the user query. The system augments the user query based on the popularity rankings. The system may generate search results based on the augmented query, or the system may output the augmented query to a search engine or other information retrieval system. Thereafter, query results based on the augmented query may be provided to the user.

The system learns from user behavior and adapts the popularity rankings according to the learned information. The system monitors the actions a user may take when presented with a set of search results. The system may record the user's actions. They system augments one or more popularity rankings based on the user's actions.

The system may expand a user query that comprises geographic content. The system obtains a popularity ranking associated with one or more of the geographic components of the query. The system associates the geographic components with a specific geographic locality. The popularity ranking associated with the geographic components of the query may also provide data related to geographic localities that are nearby or neighboring to the specific geographic locality. The system augments to user query based on the popularity ranking to increase the likelihood that the user will be presented with the most relevant results.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, with an emphasis instead being placed upon illustrating the principles of the invention. Moreover, in the figures, like referenced numerals designate corresponding parts throughout the different views.

DETAILED DESCRIPTION

The disclosed embodiments relate generally to query expansion based on inferred user preferences. The principles described herein may be embodied in many different forms. The disclosed systems and methods may allow search engines, advertisers, or other e-commerce entities to provide a user with relevant information based on the user's search query and other information, including popularity rankings associated with the user's query. The disclosed systems and methods may allow search engines to provide users with relevant advertising and media. Further, the disclosed systems and methods may minimize the amount of input and search refinements a user must provide before receiving relevant search results by expanding the user's query based on popularity rankings used to infer user preferences. For the sake of explanation, the system is described as used in a network environment, but the system may also operate outside of the network environment.

Figure 1:
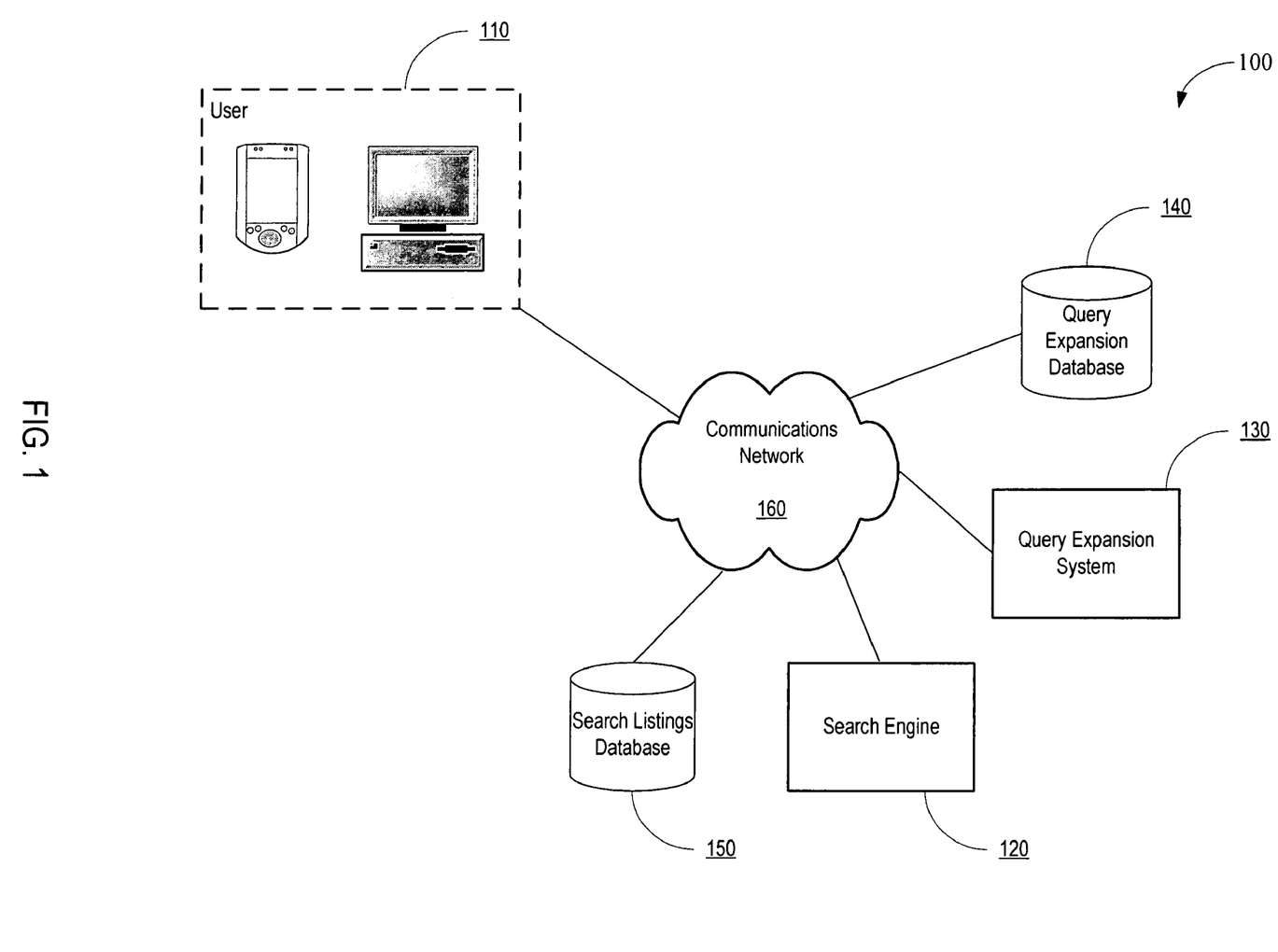
FIG. 1 shows an architecture for expanding a user query.

FIG. 1 shows an architecture 100 for expanding a user query. The architecture 100 may include a user client system 110, a search engine 120, a query expansion system 130, a query expansion database 140, and a search listings database 150. The user client system 110 may submit a query via a communications network 160 to the search engine 120, which may be implemented on a server or other network enabled system. It will be appreciated that the components of the architecture 100 may be separate, may be supported on a single server or other network enabled system, or may be supported by any combination of servers or network enabled systems.

The communications network 160 may be any private or public communications network or combination of networks. The communications network 160 may be configured to couple one computing device, such as a server, system, database, or other network enabled device, to another device to enable communication of data between computing devices. The communications network 160 may generally be enabled to employ any form of machine-readable media for communicating information from one computing device to another. The communications network 160 may include one or more of a wireless network, a wired network, a local area network (LAN), a wide area network (WAN), a direct connection such as through a Universal Serial Bus (USB) port, and the like, and may include the set of interconnected networks that make up the Internet. The communications network 160 may include any communication method by which information may travel between computing devices.

The user client system 110 may connect to the search engine 120 via the Internet using a standard browser application. A browser based implementation allows system features to be accessible regardless of the underlying platform of the user client system 110. For example, the user client system 110 may be a desktop, laptop, handheld computer, cell phone, mobile messaging device, network enabled television, digital video recorder, such as TIVO, automobile, or other network enabled user client system 110, which may use a variety of hardware and/or software packages. The user client system 110 may connect to the search engine using a stand-alone application which may be platform-dependent or platform-independent. Other methods may be used to implement the user client system 110.

The query expansion system 130 may receive the query from the search engine server directly or via the communications network 160. The query expansion system 130 may also receive the query from the user client system 110. The query expansion system 130 obtains a popularity ranking associated with the query from the query expansion database 140.

The query expansion system 130 augments the query based on the popularity ranking. Augmenting the query may include expanding or modifying the query to include terms not specifically included in the original query. Augmenting the query may also include expanding or modifying the scope of the query to include content not specifically included within the scope of the original query, but that is nonetheless relevant to the user's query. In the context of a query that contains geographic content, augmenting the user query may include geographically expanding the user query to reach search results related to geographic localities not specifically contained in the original query. Augmenting the query may also include expanding or modifying the query based on inferred user interests, preferences, and/or tendencies, i.e., based on popularity rankings.

The query expansion system 130 may generate search results based on the augmented query, or it may pass the augmented query to the search engine 120 for generating search results. The search engine 120 may include the search listings database 150 for storing the information to be searched based on the augmented query. The query expansion system 130 may also connect to the search listings database 150 directly or via the communications network 160. The query expansion system 130 and/or the search engine 120 may also include a Web server that delivers Web pages that may include responsive search results to browsers (and other files to applications).

Figure 2:
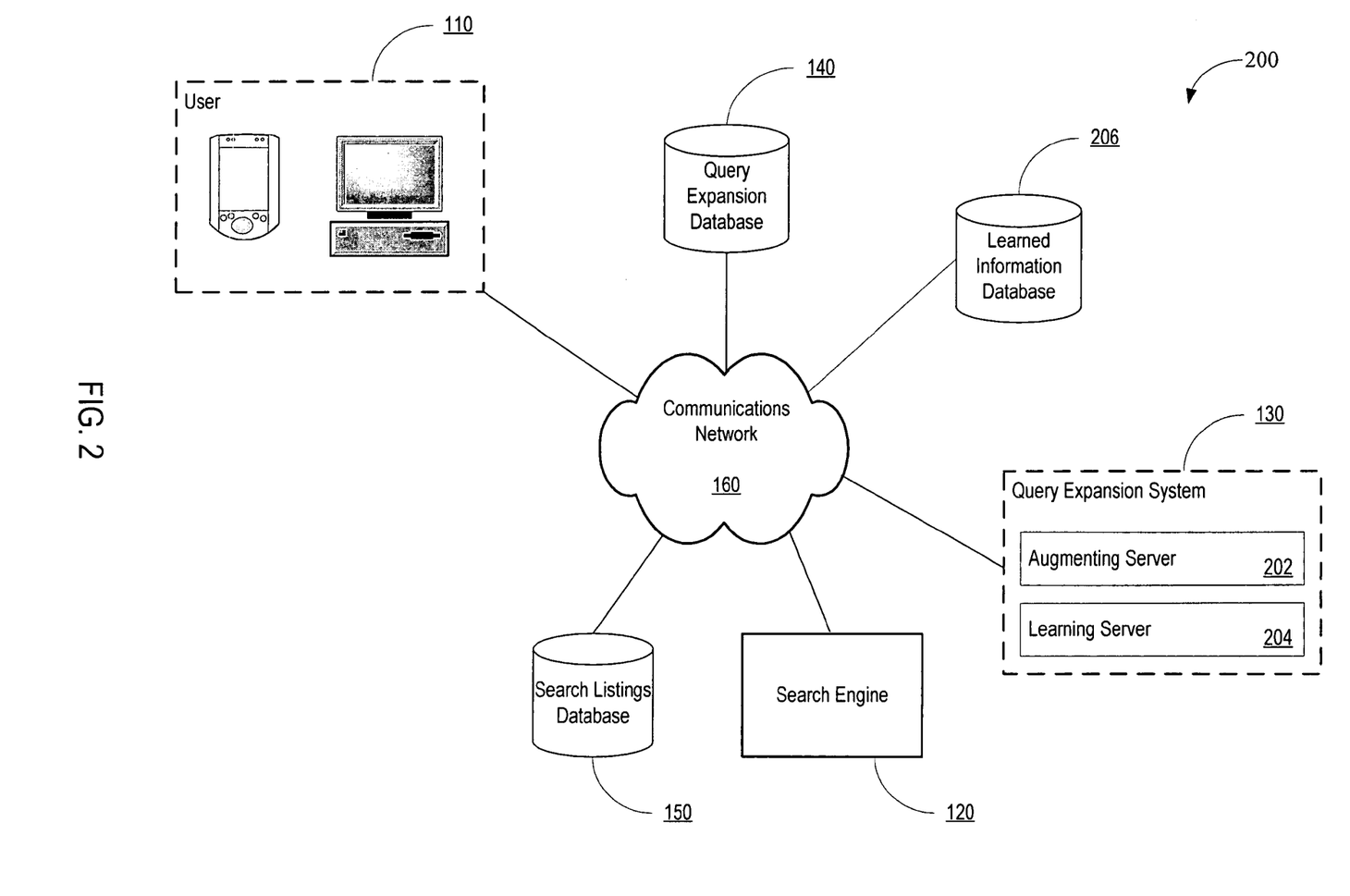
FIG. 2 shows an architecture for expanding a user query including an augmenting processor and a learning processor.

FIG. 2 shows an architecture 200 for expanding a user query including an augmenting server 202 and a learning server 204. The architecture 200 may include a user client system 110, a search engine 120, a query expansion system 130, a query expansion database 140, and a search listings database 150, similar to those described above and shown in FIG. 1. The architecture may also include a learned information database 206. The query expansion system 130 may include the augmenting server 202 and the learning server 204.

The augmenting server 202 receives a user query and accesses the query expansion database 140 to obtain one or more popularity rankings associated with the user query. The popularity rankings may include reference counts, user click behavior, query refinement data, and the like to be used in augmenting the query. Based on the popularity rankings, the augmenting server 202 augments the user query to increase the likelihood that the user will be presented with the most relevant query results. The augmenting server 202 may provide the augmented query to the search engine 120 via a communications network 160.

The learning server 204 may monitor and learn from user behavior and augment the popularity rankings based on information learned from user behavior. Where the search engine 120 and/or query expansion system 130 presents a user with a set of results, the learning server 204 may track the user's actions and formulate or reformulate the popularity rankings based on those actions. For example, given a query and search results associated with that query, the learning server 204 may track what search results a user clicks on. In another example, a user may not click on any of the presented results, but may instead refine the query. The learning server 204 may also monitor these query refinements. The learning server 204 may store the information learned from user behavior at the query expansion database 140, at a separate learned information database 206, or at a combination of these or other like databases.

The learning server 204 may also regularly update reference count popularity rankings. The learning server 204 may keep a running total of the number of times a probable query term is mentioned in some corpus of data. The corpus of data may be news articles, blogs, web pages, business listings, or other sources of data that may provide an indication of user interest. In another example, the learning server 204 may periodically scan the corpus of data, or periodically scan any data items that were added to the corpus of data since the last scan, and update the reference count based on the number of times a probable query term is mentioned.

A probable query term may be one of a set of probable query terms. The set of probable query terms may be configured according to specific functionality of the query expansion system. For example, the query expansion system 130 may be configured to analyze and expand queries with geographic content. In this example, the set of probable query terms may include terms associated with geographic localities, such as cities, states, counties, zip codes, streets, and other geographically relevant terms.

The set of probable query terms may be manually established by a user or by a system operator. The set of probable query terms may also be a learned set of terms. For example, the set of probable query terms may represent past terms that have been included within one or more queries. Further, the set of probable query terms may be updated each time a new term not already included in the set appears in a query. Alternatively, a new term may not be added to the set of probable query terms until that term has appeared in some threshold number of queries.

The learning server 204 augments the popularity rankings based on the information learned from the monitored user behavior, or based on an updated reference count. In this manner, the popularity ranking may represent inferred user interests, preferences and/or tendencies associated with a given query. When a subsequent user submits a similar query that implicates the augmented popularity ranking, the augmenting server 202 may augment the query based on the augmented popularity ranking. As such, the query expansion system 130 may regularly apply and adapt inferred user preferences, as represented by popularity rankings, to a user query so as to provide relevant query results to the user.

It will be appreciated that each of the augmenting server 202 and the learning server 204 may be separate servers, integrated together, or further sub-divided into additional discrete components. All logical and physical implementations of the described functionality are contemplated herein.

Figure 3:
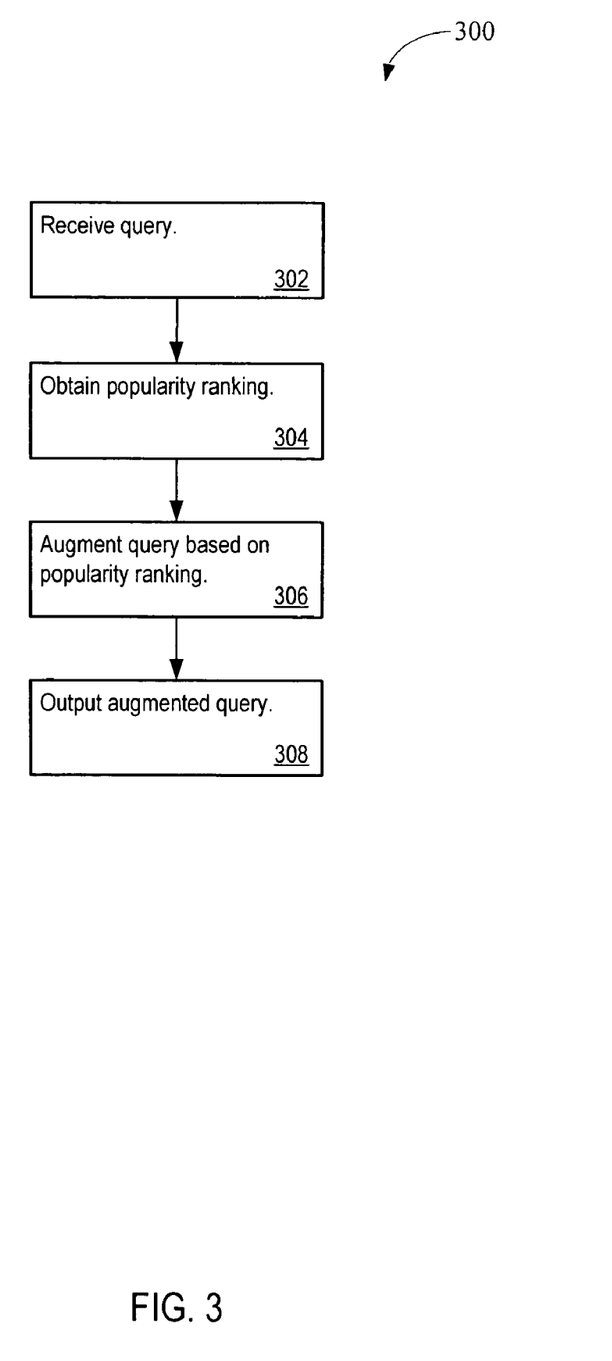
FIG. 3 shows the acts a query expansion system may take to expand a search query.

FIG. 3 shows the acts 300 a query expansion system may take to expand a search query. The query expansion system receives a user submitted query (Act 302). The query may include one or more components. For example, the query may include the components "pizza" and "Pasadena."

The query expansion system obtains a popularity ranking associated with the query (Act 304). The popularity ranking may be associated with a component or a combination of components, or with the query as a whole. For example, the popularity ranking may be associated with the phrase "pizza in Pasadena," or with the combination of "pizza" and "Pasadena." The query expansion system may also associate a popularity ranking with individual components of the query, such as by associating one popularity ranking with "pizza," and another popularity ranking with "Pasadena." In this regard, the query expansion system may also parse the query and identify the components of the query.

The query expansion system may obtain the popularity rankings from one or more databases or may include a system memory for storing the popularity rankings. The popularity rankings may be organized by category, alphabetically according to the relevant query terms, or by other methods. In one example, the query expansion system may include one or more databases associated with geographic, entertainment, automotive, medical, or other potential query categories. The query expansion system may include algorithms for classifying one or more components of a query, such as those disclosed in U.S. patent application Ser. Nos. 11/314,166 and 11/314,956 entitled "System for Classifying Words" and "System for Determining Probable Meanings of Inputted Words," respectively, which are incorporated herein by reference.

A popularity ranking may include information or a set of information representing a user inferred relationship between a queried term and one or more other terms not specifically included within the search query. The popularity ranking may include query refinement data. Query refinement data may include information related to how past users have refined unsuccessful queries. The query expansion system may track and/or store these query refinements. For example, in the past, users may often have followed a query of "pizza in Pasadena" with a query of "pizza in Altadena." When the same or another user subsequently submits a query "pizza in Pasadena," or a similar query, the query expansion system may obtain a popularity ranking associated with this or similar queries and determine that Altadena is another relevant locality, even though the term Altadena was not specifically submitted by the user.

The popularity ranking may also include user click behavior. When presented with a choice between different search results, users may in aggregate click one choice more often than another choice. The query expansion system may track and store this user click behavior as a popularity ranking. For example, when presented with results from Altadena and Glendale, users may in aggregate click on Glendale results more often than Altadena results. Thus, when expanding a query related to Pasadena, the query expansion system may use popularity rankings to determine in which of the localities that neighbor Pasadena the user may have more interest.

The popularity ranking may also include a reference count. The query expansion system may monitor a large corpus of data and track or count the number of instances different terms are referenced. The corpus of data may be news articles, blogs, Web pages, business listings, or other sources of data that may provide an indication of user interest. For example, reference to Altadena may show up more often than Glendale in the monitored corpus of data. Thus, when expanding a query related to Pasadena, the query expansion system may determine in which localities that neighbor Pasadena the user may have more interest.

There may also be multiple popularity rankings associated with a query. For example, a query may include a geographical component "Hollywood" and another component "pizza." The query expansion system may obtain a popularity ranking for one of the two components, or for each component. The query expansion system may also obtain multiple popularity rankings for each component. The query expansion system may obtain query refinement data associated with "Hollywood" that shows that the localities of "Los Angeles" and "Beverly Hills" are also relevant to a query including the term "Hollywood." The query expansion system may also obtain a reference count that ranks "Los Angeles" and "Beverly Hills." The query expansion system may also obtain user click behavior that shows that when presented with results from "Los Angeles" and "Beverly Hills," users whose query included "Hollywood" in aggregate prefer one proximate locality over the other.

The query expansion system may augment the query submitted by the user based on the popularity rankings, i.e., based on the query refinement data, user click behavior, and/or reference counts (Act 306). The query expansion system may augment a query based on one popularity ranking, or any combination of popularity rankings.

For example, the query expansion system may receive a query for "pizza in Pasadena." The augmenting of queries that include geographic content is discussed in more detail below. Briefly, the query expansion system may associate the geographic content of the query with a specific geographic locality. This may include disambiguating the query where the geographic terms are potentially ambiguous. The term "Pasadena", for example, may refer to the Pasadena in Texas, California, Maryland, Australia, etc. As discussed below, the query expansion system may use the popularity rankings to disambiguate the query and associate the query with a specific geographic locality.

Returning to the "pizza in Pasadena" example, the query expansion system may use query refinement data to determine that users often refine a query for "pizza in Pasadena" as "pizza in Altadena" or "pizza in Glendale." The query expansion system may expand the "pizza in Pasadena" query to include the Altadena and Glendale localities. In this example, the query expansion system may add the terms "Altadena" and/or "Glendale" to the query. For example, the query may be expanded as "'pizza in Pasadena' Altadena Glendale." The query may be expanded as "'pizza in Pasadena' 'pizza in Altadena' 'pizza in Glendale.'" The query expansion system may use other methods to augmenting the query based on the popularity ranking as well.

The query expansion system may also apply user click behavior associated with the "pizza in Pasadena" query to determine that users presented with a choice between Altadena and Glendale tend to choose Altadena. The query expansion system may thus further augment the "pizza in Pasadena" query to include just Altadena. As an alternative, the query expansion system may consider both Altadena and Glendale, but may augment the query by ranking or weighting Altadena above Glendale in the augmented query.

As mentioned above, the query expansion system may obtain and apply a popularity ranking for multiple components of a query. For example, based on a popularity ranking associated with the term "pizza," the query expansion system may identify a user inferred relationship between the term "pizza" and the terms "Italian" or "Italian food." In other words, an analysis of one or more popularity rankings associated with "pizza" or "pizza in Pasadena" may show that results related to "Italian food in Pasadena" are likely to be relevant to a user who queried for "pizza in Pasadena." Thus, in addition to augmenting a query by expanding the geographical reach of the query (such as by expanding the query to include another locality), the query expansion system may also use popularity rankings to expand the conceptual reach of the query (such as by expanding the query to include another restaurant type or food type).

The query expansion system may provide the augmented query to a search engine (Act 308). In this manner, the query expansion system may enable a search engine to reliably search for and present the user with relevant results based in part on query terms not specifically submitted by the user. The results presented to the user may be advertisements, media, Web pages, articles, or other information determined to be relevant to the augmented query.

The query expansion system may also provide a result ranking associated with the results of the augmented query. The order in which the results are presented to the user may be affected by the result ranking. The result ranking may include the number of occurrences within the results for one or more of the queried terms in business listings, algorithmic listings, sponsored search listings, and/or other listings databases.

For example, the query expansion system may have augmented a query for "pizza in Pasadena" to also include pizza listings in Altadena and Glendale. In this example, the query expansion system may rank the Altadena and Glendale listings according to the number of pizza listings associated with each locality, e.g., ranking Altadena listings above Glendale listings where Altadena has ten pizza listings and Glendale has five. In another example, the query expansion system may have augmented the "pizza in Pasadena" query to also include Italian food. In this instance, the query expansion system may rank the Altadena and Glendale listings according to the number of pizza or Italian food listings associated with each locality. The query expansion system may also rank the pizza listings separate from the Italian food listings and list the ranked Altadena and Glendale pizza listings first, followed by the ranked Altadena and Glendale Italian food listings.

The result ranking may also include aggregate user feedback data. The aggregate user feedback data may be feedback ratings from sources such as local.yahoo.com corresponding to one or more of the queried terms. For example, where the query expansion system augmented a query to include neighboring localities, the results of the augmented query may be listed in order corresponding to user feedback associated with those neighboring localities. Referring again to the "pizza in Pasadena" query, the results associated with Altadena may be ranked higher if the collective user rating of restaurants, pizza restaurants, and/or Italian restaurants in Altadena is higher than that of Glendale.

The result ranking may also include the popularity rankings. For example, the results may be ranked according to the relative reference counts associated with any neighboring localities included in the augmented query. The results may be ranked according to user click behavior. The results may also be ranked according to query refinement data.

Figure 4:
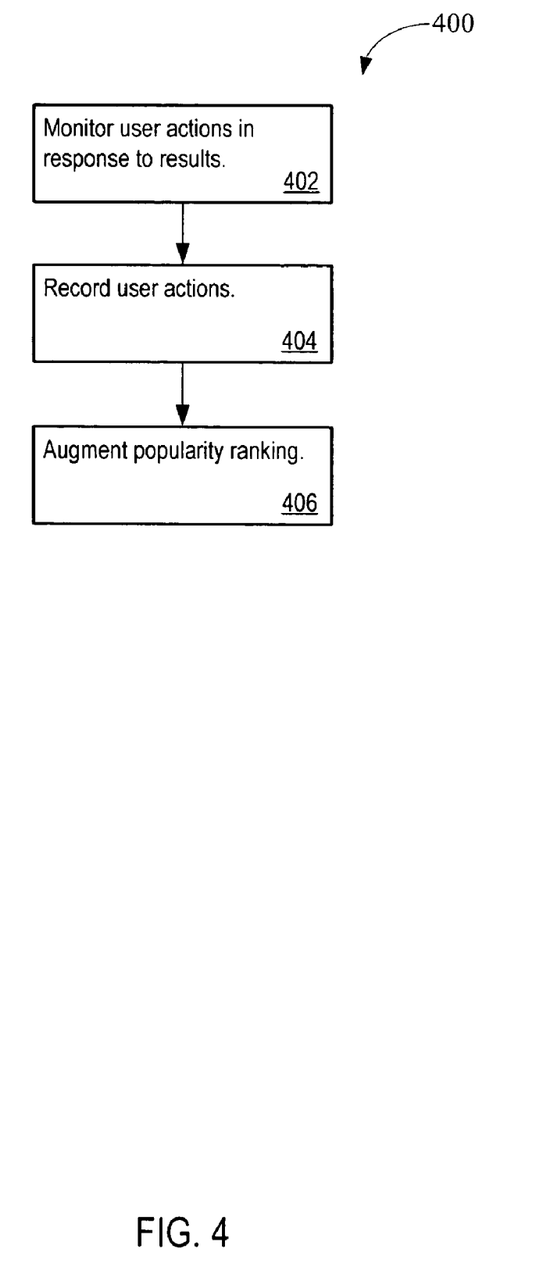
FIG. 4 shows the acts a query expansion system may take to augment a popularity ranking based on information learned from user behavior.

FIG. 4 shows the acts 400 a query expansion system may take to augment a popularity ranking based on information learned from user behavior. In the manner described above and shown in FIG. 3, the query expansion system augments a user query based on a popularity ranking and provides the augmented query to a search engine. The search engine or other information retrieval system may generate search results based on the augmented query and provide those results to the user. The query expansion system monitors the user's actions in response to the search results (Act 402). The user may click on one of the presented results. The user may refine the query with a new query. The user may click on an advertisement or other banner. The user may take other actions when presented with the search results.

The query expansion system may record data related to the user's actions, such as by the actions, or statistics associated with the actions, in a database (Act 404). The query expansion system augments the popularity rankings associated with the user query based on the recorded data (Act 406). In this manner, the query expansion system learns and adapts to user behavior in order to provide more relevant results to subsequent user queries. The popularity rankings may be updated by the user behavior manually or automatically. The query expansion system may update the popularity rankings using derived algorithms. The query expansion system may also employ neural networks or other learning techniques so as to regularly augment the popularity rankings.

Figure 5:
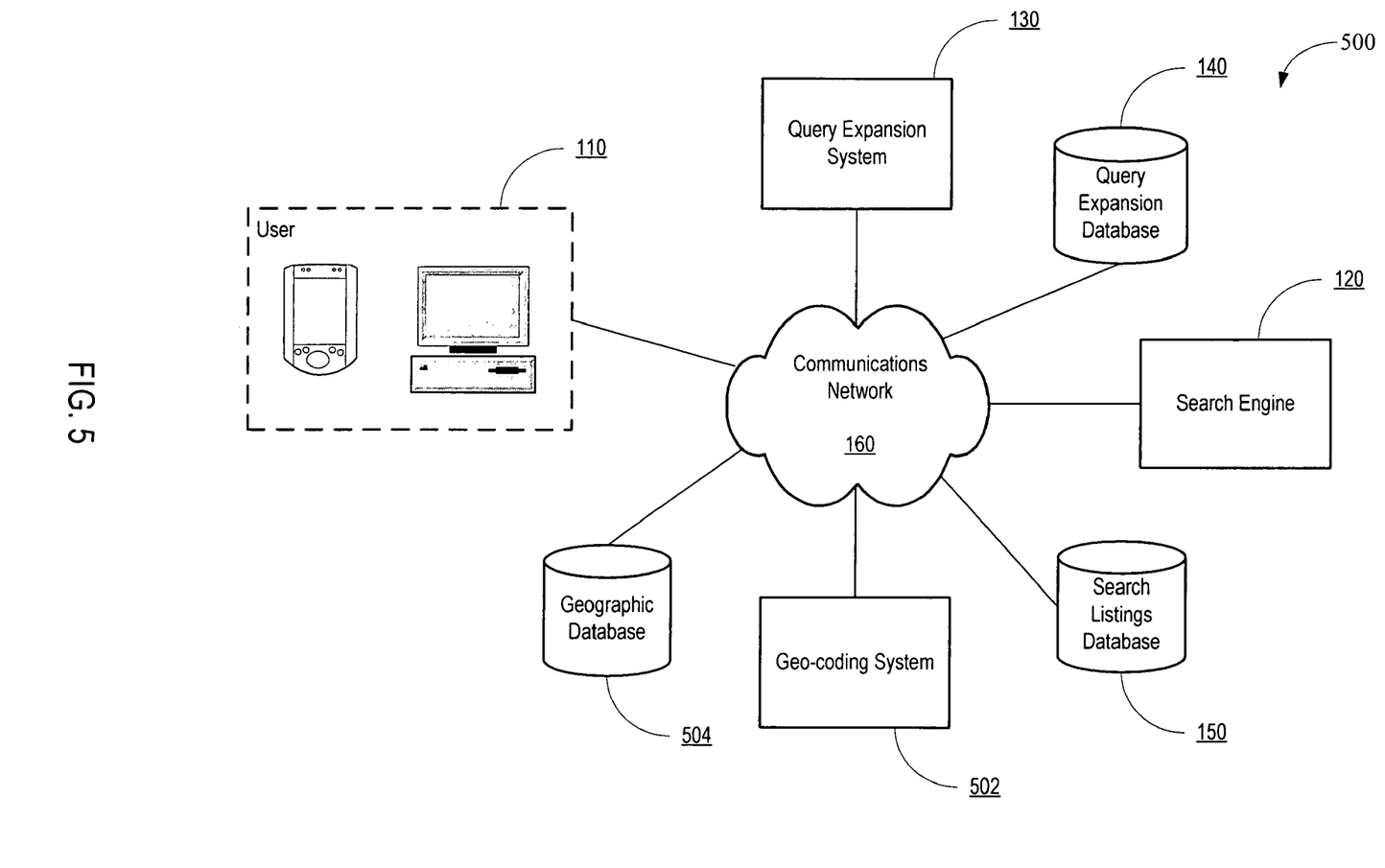
FIG. 5 shows an architecture for expanding a geographic query based on a popularity ranking.

FIG. 5 shows an architecture 500 for expanding a geographic query based on one or more popularity rankings. In the past, a system for responding to geographic queries may have by returned results related to localities located within some predefined distance from the queried locality. However, for a given locality, people often tend to gravitate in a particular direction for certain services. In expanding out in all directions from the queried locality by some set distance, past systems may not have accurately captured user intent and often returned irrelevant search results. A popularity ranking associated with a geographic locality may represent inferred user preferences related to that geographic locality and the surrounding area. Thus, by augmenting a geographic query based on a popularity ranking, the query expansion system may capture the tendencies and preferences of users and consumers toward certain localities.

The architecture 500 may include a user client system 110, a search engine 120, a query expansion system 130, a query expansion database 140, and a search listings database 150, similar to those described above and shown in FIGS. 1 and 2. The architecture may also include a geo-coding system 502 and a geographical database 504. The elements of the architecture 600 may communicate via a communications network 160. The geo-coding system 502 may include the geographical database 504, or it may connect to the geographical database 504 directly or via the communications network 160.

The query expansion system 130 may receive a geographic query from the user client system 110 or from the search engine 120. The query expansion system 130 may identify the geographic locality, or geographic localities, queried by the user. In some instances, the query expansion system 130 may disambiguate which geographic locality the user intended to refer to. For example, it may not be readily apparent from a query for "restaurants in Pasadena" whether relevant results should relate to restaurants in Pasadena, Calif. or in Pasadena, Tex. The query expansion system 130 may disambiguate the user's query based on one or more popularity rankings associated with the query. The query expansion system 130 may include, or be connected to, the query expansion database 140 for storing the popularity rankings.

The query expansion system 130 may also employ geo-coding techniques to disambiguate the geographic query, such as the techniques disclosed in U.S. patent application Ser. No. 11/314,191, entitled "System and method for Geo-coding Using Spatial Geometry," which is incorporated herein by reference. The geographical database 504 may store information used by the geo-coding system 502 for disambiguating the geographic query. In this example, the geo-coding system 502 may disambiguate the geographic query and identify the geographic locality associated with the query. The query expansion system 130 may obtain one or more popularity rankings associated with the identified geographic locality.

The query expansion system 130 may also use the popularity rankings to augment the geographic query. The geographic query may be augmented by expanding the query to include certain neighboring localities favored by users. To this end, the popularity rankings may provide information about neighboring geographic localities. For example, query refinement data, user click behavior, and/or reference counts may indicate that an expansion of the query to include restaurants in one or more neighboring localities will likely produce relevant search results.

The query expansion system 130 may identify neighboring localities based on information provided by the popularity rankings. As an alternative, the query expansion system 130 may include, or be connected to, the geo-coding system 502 for identifying one or more neighboring geographic localities. An example of such a system is disclosed in U.S. patent application Ser. No. 11/314,191, referenced above. The geographical database 504 may include neighborhood information, or may include information the geo-coding system 502 may use to identify neighboring geographic localities. The neighboring geographic localities may be localities that are adjacent to the geographic locality queried by the user.

The query expansion system 130 may receive the identified neighboring geographic localities and obtain popularity rankings associated with one or more of the identified neighboring localities. The query expansion system 130 may rank the neighboring geographic localities based on the popularity rankings.

The query expansion system 130 may augment the geographic query based on any combination of the popularity rankings associated with the queried geographic locality and the popularity rankings associated with the neighboring localities. Where the query expansion system 130 ranked the neighboring localities, the query expansion system 130 may also augment the geographic query based on the ranking. The query expansion system 130 may communicate the augmented query to the search engine 120 for generating and/or providing relevant search results to the user.

Figure 6:
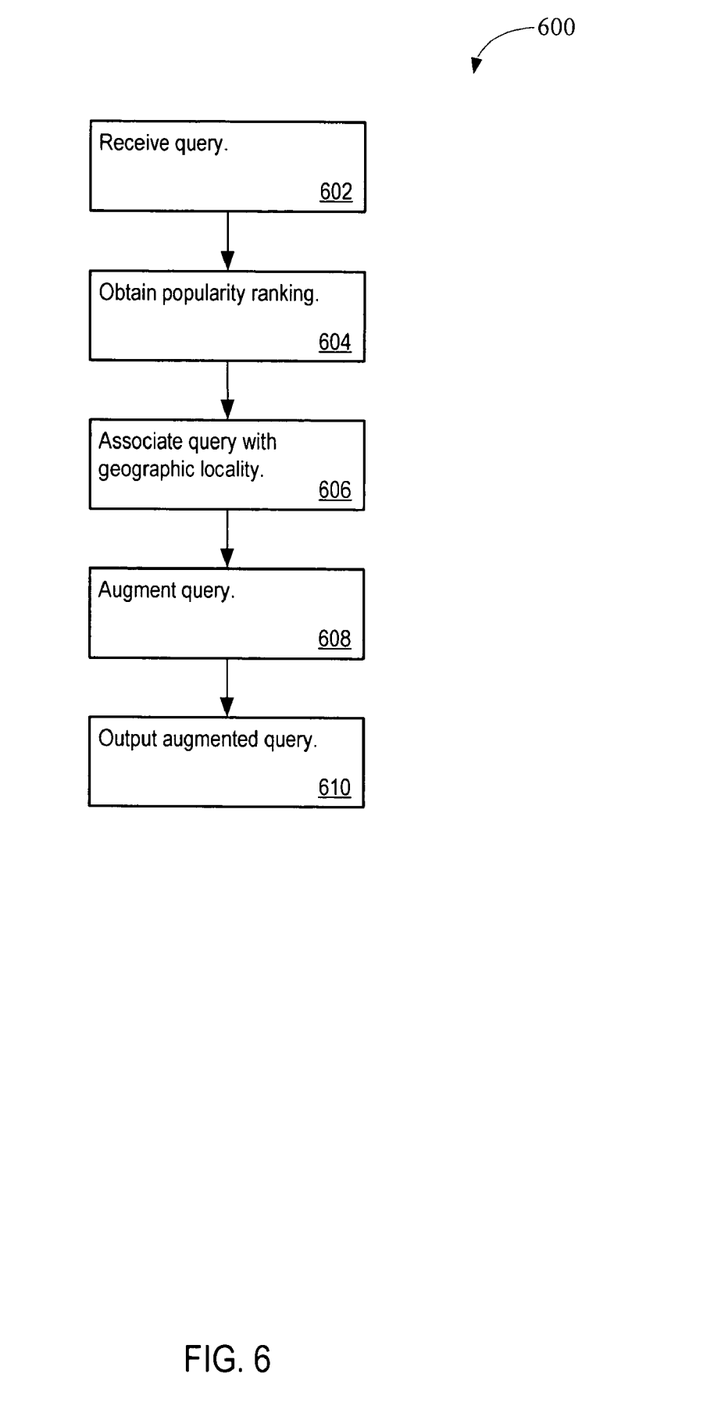
FIG. 6 shows the acts a query expansion system may take to expand a query comprising geographic components.

FIG. 6 shows the acts 600 the query expansion system may take to expand a query comprising geographic components. The query expansion system receives a search query from a user (Act 602). The query may include one or more components, including one or more geographic components. Examples of geographic components include zip codes, area codes, street names, city names, county names, state names, or other address-type terms. Other examples of geographic components include the name of a stadium, a park, a neighborhood, an administrative district, and other arbitrary terms referencing a locality.

The query expansion system obtains a popularity ranking associated with the query (Act 604). The popularity ranking may be associated with a component or a combination of components, or with the query as a whole. As discussed above, the query expansion system may access a database to obtain the popularity ranking. The query expansion system may apply a look-up, a matching algorithm, or other information retrieval method to obtain one or more popularity rankings that are relevant to the query, or components of the query.

The query expansion system may associate the query with a geographic locality (Act 606). This step may include disambiguating the query where it is not clear from the query which of multiple geographic localities the user intended, such as with a query including the terms "Springfield," "Pasadena," "Hollywood," "Washington," or other terms that potentially refer to more than one locality. The query expansion system may use the popularity rankings to disambiguate the geographic component and identify it with a specific geographic locality.

For example, where a user submits a query "theatres in Hollywood," the query expansion system may disambiguate between Hollywood, Fla. and Hollywood, Calif. A popularity ranking related to query refinement data may indicate that past users that submitted a query for "theatres in Hollywood," or a similar query, often followed up such a query with "theatres in Beverly Hills" or "theatres in Hollywood, Calif." In this example, the query expansion system may disambiguate the query and associate the "theatres in Hollywood" query with Hollywood, Calif.

The query expansion system may also apply a reference count popularity criteria to disambiguate the query. For example, the reference count may indicate that Hollywood, Calif. is referenced more often than Hollywood, Fla. The query expansion system also may apply user click behavior popularity rankings to infer that a user would prefer results related to one Hollywood or the other. In these examples, the query expansion system may determine that a user is interested in results related to Hollywood, Calif. and then accordingly associate the query with the appropriate geographic locality.

The query expansion system associates the query with a geographic locality, including disambiguating the query where necessary, using a geo-coding technique. The query expansion system may be configured for geo-coding, or it may be in communication with a system configured to geo-coding. Where a geo-coding technique is used to associate the query with a geographic locality, the query expansion system may obtain one or more popularity rankings associated with the geographic locality identified by the geo-coding technique.

In one implementation, there may be a unique identifier associated with each geographic locality. Where the geographic content of a query is disambiguated and associated with a specific geographic locality, the unique identifier associated with that specific geographic locality may be obtained and/or provided to the search engine or included in the augmented query.

The query expansion system may also employ geo-coding techniques, or be connected to a geo-coding system that employ geo-coding techniques, for identifying one or more localities that are adjacent or nearby to a specific locality.

Where the query expansion system is connected to such a geo-coding system, the query expansion system may communicate the query, the components of the query, and/or the geographic locality associated with the components to the geo-coding system. The query expansion system may receive from the geo-coding system an identification of one or more of the neighboring localities.

The query expansion system augments the geographic query based on the popularity ranking (Act 608). Where one or more popularity rankings were used to disambiguate the geographic query, the query expansion system may apply the same popularity rankings used to disambiguate the query, or it may obtain new popularity rankings related to the geographic locality to which the geographic component of the query was associated according to Act 606. The query expansion system may use one or more popularity rankings to augment the query to include other geographic localities, such as proximate geographic localities, in the manner described above with reference to FIG. 3.

As part of the augmenting step, the query expansion system may also identify and/or rank localities that neighbor or are nearby to the queried locality. To this end, the query expansion system may identify one or more neighboring localities. The neighboring localities may be identified based on the popularity rankings associated with the query. For example, there are approximately ten cities that are adjacent to Pasadena, Calif. Query refinement data associated with the term Pasadena, or with the queried phrase "pizza Pasadena," may indicate that users have followed a query of "pizza Pasadena" with the queries of "pizza Altadena," "pizza Glendale," "pizza Arcadia," and "pizza South Pasadena." Based on these query refinements the query expansion system may identify Altadena, Glendale, Arcadia, and South Pasadena as nearby or neighboring localities.

The query refinement data may also indicate that the number of query refinements related to Altadena and Glendale were significantly more than the number of refinements related to the other neighboring localities. From this information, the query expansion system may rank the Altadena and Glendale localities above the Arcadia and South Pasadena localities. The query expansion system may further rank the neighboring localities based on other popularity rankings associated with the query. For example, user click behavior associated with the "pizza Pasadena" query may indicate that users presented with results from Altadena and Glendale in aggregate click on the results from Glendale. The query expansion system may thus further rank Glendale above Altadena for the purposes of augmenting the geographic query.

The query expansion system may also obtain popularity rankings associated with one or more of the neighboring geographic localities. Popularity rankings associated with the neighboring geographic localities may provide information about the relative popularity of each locality. For example, where the neighboring localities of Pasadena are identified, the query expansion system may obtain a reference count associated with each neighboring geographic locality and rank the neighboring localities accordingly. The query expansion system may augment the query based on the ranking. For example, the query expansion system may augment the query to include one or more of the highest-ranked neighboring geographic localities. The query expansion system may also augment the query by weighting the localities according to the ranking.

The query expansion system may output the augmented query to another system that generates search results responsive to the augmented query and displays those results to the user (Act 610). As described above, the query expansion system may also monitor the user's actions in response to the displayed results and augment the popularity rankings based on the user's actions. In this manner, the query expansion system may enhance the likelihood that a user will be presented with the most relevant results the next time a similar query is submitted.

Figure 7:
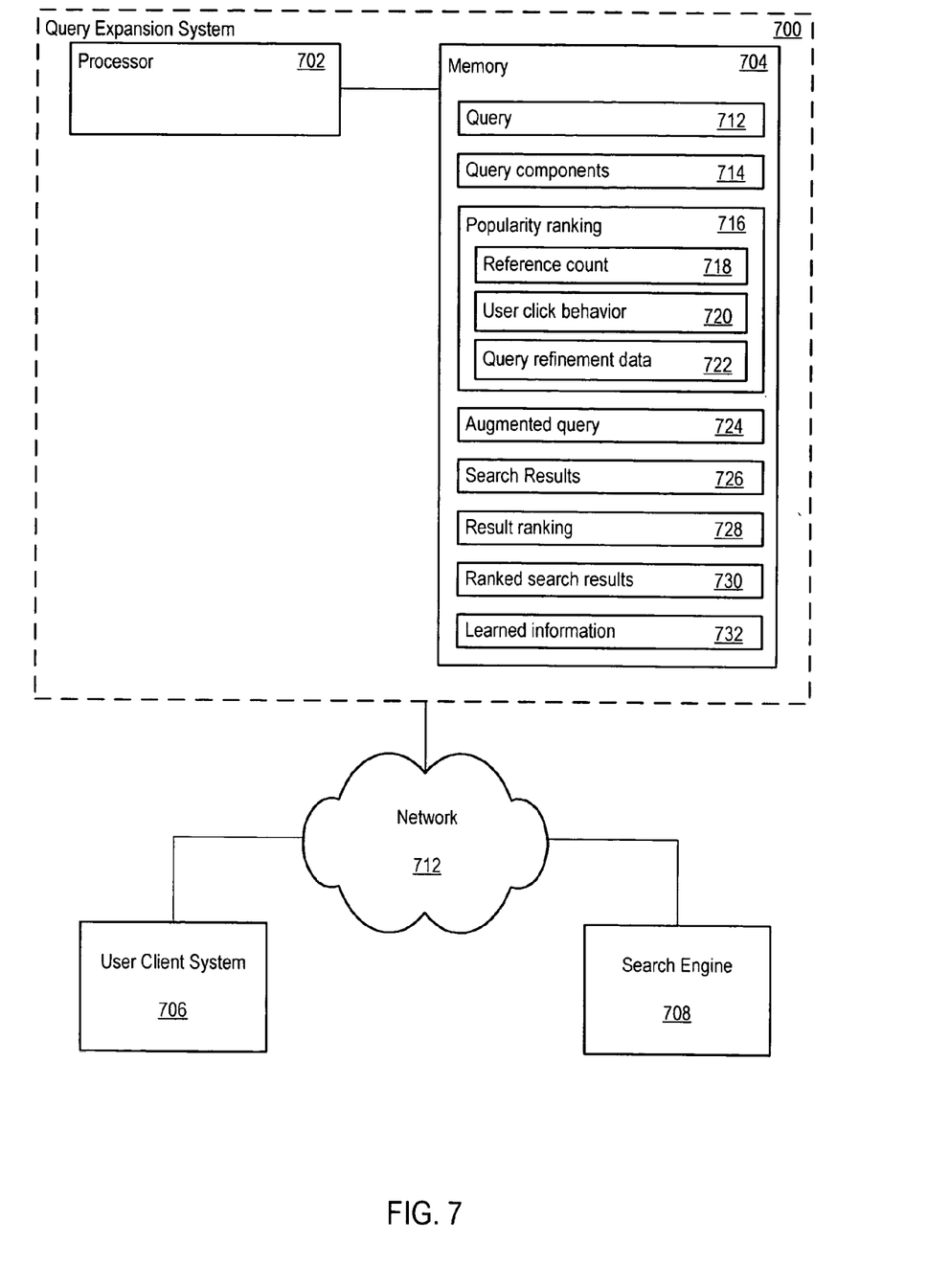
FIG. 7 shows a query expansion system including a processor and a memory.

FIG. 7 shows a query expansion system 700 including a processor 702 and a memory 704. The processor 702 may execute instructions stored on the memory 704 to augment a query submitted by a user to provide the relevant results in response to the query. The processor 704 may also execute instructions stored on the memory 704 to regularly learn from and adapt to user tendencies and preferences. The query expansion system 700 may communicate with a user client system 706 and a search engine 708 via a communications network 710.

The memory 704 may store a query 712, query components 714, and popularity rankings 716. The popularity rankings 716 may include a reference count 718, user click behavior 720, and/or query refinement data 722. The memory 704 may also store an augmented query 724, search results 726, result rankings 728, ranked search results 730, and learned information 732.

The query expansion system may receive a query from the user client system 706. The processor 702 may execute instructions for parsing the query 712 to identify the query components 714. The processor 702 may also execute instructions for obtaining one or more popularity rankings 716 based on the query 712 or query components 714.

The processor 702 may execute instructions for generating the augmented query 724 by augmenting the query 712 based on the popularity rankings 716. The processor 702 may execute instructions for communicating the augmented query 724 to the search engine 708 for generating search results that are relevant to the augmented query 724, which may then be provided to the user. The query expansion system 700 may receive the search results 726 from the search engine and store the results 726 in the memory 704. The processor 702 may execute instructions for generating ranked search results 730 based on the result rankings 728 and for communicating the ranked search results 730 to the search engine 708. As an alternative, the query expansion system 700 may enable ranking of the search results by executing instructions for communicating the result ranking 726 to the search engine 708.

The processor 704 may execute instructions for monitoring actions a user may take when presented with a set of search results. The processor 704 may execute instructions for storing monitored data related to those actions as the learned information 732. The processor 704 may also execute instructions for augmenting the popularity rankings 716 based on the learned information 732.

From the foregoing, it can be seen that the present invention provides improved search quality by intuitively augmenting or modifying user queries based on user interests, preferences, and/or tendencies, i.e., based on popularity rankings. In particular, the present invention provides improved search quality for user queries that may have few if any exact matches. Such queries often result in dissatisfied users having to refine or abandon the search. The present invention improves user satisfaction by providing, or enabling a search engine to provide, relevant search results to the user even if those relevant results did not exactly match the user's original query. In the context of a query that contains geographic content, the present invention geographically expands the scope of a user query to include relevant localities or regions not specifically included in the original query.

Although selected aspects, features, or components of the implementations are depicted as being stored in memories, all or part of the systems, including the methods and/or instructions for performing such methods consistent with the query expansion system, may be stored on, distributed across, or read from other machine-readable media, for example, secondary storage devices such as hard disks, floppy disks, and CD-ROMs; a signal received from a network; or other forms of ROM or RAM either currently known or later developed.

Specific components of a query expansion system may include additional or different components. A processor may be implemented as a microprocessor, microcontroller, application specific integrated circuit (ASIC), discrete logic, or a combination of other types of circuits or logic. Similarly, memories may be DRAM, SRAM, Flash, or any other type of memory. Parameters (e.g., popularity rankings), databases, and other data structures may be separately stored and managed, may be incorporated into a single memory or database, or may be logically and physically organized in many different ways. Programs or instruction sets may be parts of a single program, separate programs, or distributed across several memories and processors.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:

1. A method for augmenting a user query, comprising:
receiving the user query;
obtaining a first popularity ranking associated with the user query, where the user query comprises a geographic component;
associating the geographic component of the user query with a first geographic locality;
identifying a plurality of neighboring geographic localities comprising geographic localities in proximity to the first geographic locality, where one of the plurality of neighboring localities is a first neighboring geographic localities identified based on the first popularity ranking;
ranking, using a processor, the plurality of neighboring localities based on the first popularity ranking, where ranking the plurality of neighboring geographic localities comprises weighting each geographic locality of the plurality of neighboring geographic localities based on the first popularity ranking;
generating, using the processor, an augmented query by augmenting the user query based on the first popularity ranking, the first neighboring geographic locality identified based on the first popularity ranking, and the ranking of the plurality of neighboring geographic localities, where the augmenting of the user query comprises expanding the user query to include the weighted geographic localities of the plurality of neighboring geographic localities; and
providing the augmented query to a search engine.

2. The method of claim 1, further comprising disambiguating the user query based on the first popularity ranking.

3. The method of claim 1, further comprising obtaining neighboring locality popularity rankings associated with each geographic locality of the plurality of neighboring geographic localities, where the ranking is based on the neighboring locality popularity rankings.

4. The method of claim 1, where the first popularity ranking comprises a reference count.

5. The method of claim 1, where the first popularity ranking comprises user click behavior.

6. The method of claim 1, where the first popularity ranking comprises query refinement data.

7. The method of claim 1, further comprising obtaining a second popularity ranking associated with the user query, where the user query comprises a first component and a second component, and where the first popularity ranking is obtained based on content of the first component and the second popularity ranking is obtained based on content of the second component.

8. The method of claim 7, further comprising augmenting the user query based on the second popularity ranking.

9. The method of claim 1, further comprising:
monitoring user behavior; and
augmenting the first popularity ranking based on the user behavior.

10. The method of claim 1, where the first popularity ranking comprises user inferred preferences related to the first geographic locality and to the first neighboring geographic locality.

11. The method of claim 1, where the first neighboring geographic locality identified based on the first popularity ranking was not included in the user query, and where the augmenting of the user query comprises expanding the user query to include the first neighboring geographic locality identified based on the first popularity ranking.

12. A query expansion system for augmenting a query, the query expansion system comprising:
a processor;
a memory coupled to the processor, the memory comprising instructions that cause the processor to:
obtain a first popularity ranking associated with a received user query;
associate the received user query with a first geographic locality where the received user query comprises a geographic component;
identify a plurality of neighboring geographic localities comprising geographic localities that are proximate to the first geographic locality;
identify, based on the first popularity ranking, a first neighboring geographic locality from among the plurality of neighboring geographic localities;
rank the plurality of neighboring geographic localities based on the first popularity ranking, where ranking the plurality of neighboring geographic localities comprises weighting each geographic locality of the plurality of neighboring geographic localities based on the first popularity ranking;
generate an augmented query by augmenting the received user query based on the first popularity ranking, the first neighboring geographic locality identified based on the first popularity ranking, and the ranking of the plurality of neighboring geographic localities, where the augmenting of the received user query comprises expanding the received user query to include the weighted geographic localities of the plurality of neighboring geographic localities; and
provide the augmented query to a search engine.

13. The query expansion system of claim 12, where the first popularity ranking comprises user click behavior.

14. The query expansion system of claim 12, where the memory further comprises instructions that cause the processor to:
monitor a user's response to search results generated from the augmented query; and augment the first popularity ranking based on the user's actions.

15. The query expansion system of claim 12, where the received user query is associated with the first geographic locality based on the first popularity ranking.

16. The query expansion system of claim 12, where the first neighboring geographic locality identified based on the first popularity ranking was not included in the user query, and where the augmenting of the received user query comprises expanding the user query to include the first neighboring geographic locality identified based on the first popularity ranking.

17. A system for augmenting a query comprising:
an augmenting server configured to:
  obtain a first popularity ranking associated with a received user query;
  associate the received user query with a first geographic locality;
  identify neighboring geographic localities based on the first popularity ranking, where the neighboring geographic localities are in proximity to the first geographic locality;
  rank the identified neighboring geographic localities based on the first popularity ranking, where ranking the identified neighboring geographic localities comprises weighting each of the identified neighboring geographic localities based on the first popularity ranking;
  generate an augmented query by augmenting the received user query based on the first popularity ranking and on the ranking of the identified neighboring geographic localities, where augmenting the received user query comprises expanding the received user query to include the weighted neighboring geographic localities; and
  provide the augmented query to a search engine;
a web server configured to receive results from the search engine and present the results to a user; and
a learning server configured to:
  monitor a user's response to the search results; and
  augmenting the first popularity ranking based on the user's actions.

18. The system of claim 17, where the learning server is further configured to:
scan a corpus of data;
track a number of times a term appears in the corpus of data; and
augment the first popularity ranking based on the number of times the term appears in the corpus of data.

19. The system of claim 17, where the augmented query is augmented to include one or more of the neighboring geographic localities based on the first popularity ranking.

20. The system of claim 17, where the augmenting server is further configured to disambiguate the received user query based on the first popularity ranking.

21. The system of claim 17, where the augmenting server is further configured to:
generate a result ranking; and
order the search results based on the result ranking.

* * * * *